US007864896B2

(12) United States Patent
Hwang et al.

(10) Patent No.: US 7,864,896 B2
(45) Date of Patent: Jan. 4, 2011

(54) APPARATUS AND METHOD FOR GENERATING LOG LIKELIHOOD RATIO IN MULTIPLE-INPUT MULTIPLE-OUTPUT COMMUNICATION SYSTEM

(75) Inventors: Keun-Chul Hwang, Seongnam-si (KR); Soong-Yoon Choi, Suwon-si (KR); Soon-Young Yoon, Seoul (KR)

(73) Assignee: Samsung Electronics Co., Ltd (KR)

( * ) Notice: Subject to any disclaimer, the term of this patent is extended or adjusted under 35 U.S.C. 154(b) by 922 days.

(21) Appl. No.: 11/784,435

(22) Filed: Apr. 6, 2007

(65) Prior Publication Data

US 2007/0237272 A1 Oct. 11, 2007

(30) Foreign Application Priority Data

Apr. 6, 2006 (KR) .................. 10-2006-0031377

(51) Int. Cl.
*H04L 27/06* (2006.01)
(52) U.S. Cl. ...................... 375/341; 375/347
(58) Field of Classification Search ............... 375/262, 375/265, 267, 316, 341, 347, 349
See application file for complete search history.

(56) References Cited

U.S. PATENT DOCUMENTS

| 7,508,891 B2* | 3/2009 | Jung et al. ................ 375/347 |
| 7,526,037 B2* | 4/2009 | Hoo ........................ 375/267 |
| 7,639,660 B2* | 12/2009 | Kim et al. ................ 370/343 |
| 2004/0066866 A1* | 4/2004 | Tong et al. ............... 375/347 |
| 2005/0018789 A1* | 1/2005 | Jia et al. .................. 375/316 |
| 2005/0111592 A1* | 5/2005 | Yee ......................... 375/341 |
| 2006/0104390 A1* | 5/2006 | Graef et al. .............. 375/341 |
| 2007/0077969 A1* | 4/2007 | Lauer et al. .............. 455/562.1 |
| 2007/0092020 A1* | 4/2007 | Seki ........................ 375/267 |
| 2007/0116143 A1* | 5/2007 | Bjerke et al. ............. 375/262 |
| 2007/0263735 A1* | 11/2007 | Tong et al. ............... 375/260 |

FOREIGN PATENT DOCUMENTS

| JP | 2003-348057 | 12/2003 |
| KR | 1020070046331 | 5/2007 |
| KR | 1020070052037 | 5/2007 |

OTHER PUBLICATIONS

Sang Wu Kim et al., Log-Likelihood-Ratio-Based Detection Ordering in V-Blast, IEEE Transactions on Communications, vol. 54, No. 2, Feb. 2006.
"Complexity-Reduced Maximum Likelihood Detection Based on Replica Candidate Selection with QR Decomposition Using Pilot-Assisted Channel Estimation and Ranking for MIMO Multiplexing Using OFCDM", IEICE Technical Report, vol. 103; pp. 55-60, Feb. 25, 2004.
Kenji Sumii et al., "A Simplified Iterative Processing of Soft MIMO Detector and Turbo Decoder in a Spatially Multiplexed System", Jun. 1, 2005.

* cited by examiner

*Primary Examiner*—Emmanuel Bayard
(74) *Attorney, Agent, or Firm*—The Farrell Law Firm, LLP (57) ABSTRACT

An apparatus and method for generating LLRs in an MIMO communication system. In a receiver for a spatial multiplexing communication system, a determiner performs an MML decoding operation in an ascending or descending order of TX antennas to estimate a plurality of candidate TX vectors. A distance calculator calculates a Euclidean distance for each of the candidate TX vectors from the determiner. An LLR calculator calculates LLRs using the Euclidean distances from the distance calculator. Accordingly, it is possible to generate an LLR with high reliability at low complexity in an MIMO communication system.

18 Claims, 7 Drawing Sheets

APPARATUS AND METHOD FOR GENERATING LOG LIKELIHOOD RATIO IN MULTIPLE-INPUT MULTIPLE-OUTPUT COMMUNICATION SYSTEM

PRIORITY

This application claims priority under 35 U.S.C. §119 to an application filed in the Korean Intellectual Property Office on Apr. 6, 2006 and allocated Serial No. 2006-31377, the contents of which are incorporated herein by reference.

BACKGROUND OF THE INVENTION

1. Field of the Invention

The present invention relates generally to a Multiple-Input Multiple-Output (MIMO) communication system, and more particularly, to an apparatus and method for generating a high-reliability Log Likelihood Ratio (LLR) in a Spatial Multiplexing (SM) communication system.

2. Description of the Related Art

Demand for various wireless multimedia services has increased significantly due to rapid growth of the wireless mobile communications market and, in particular, improvements in high-capacity and high-rate data transmission are underway. Accordingly, a discovery of a method for efficiently using a limited amount of frequency resources is urgently needed. A new communication scheme using multiple antennas, an example of which is a MIMO communication system using multiple antennas, would be helpful.

A MIMO communication system uses multiple transmit (TX) antennas and multiple receive (RX) antennas. Unlike a single-antenna communication system, a MIMO communication system can increase channel transmission capacity in proportion to the number of antennas even without allocation of additional frequency and TX power. Thus, extensive research is being conducted on MIMO communication schemes.

Multiple-antenna transmission schemes can be broadly classified into a Spatial Diversity (SD) scheme, a Spatial Multiplexing (SM) scheme, and a hybrid thereof. An SD scheme provides a diversity gain corresponding to the number of TX antennas and the number of RX antennas, thereby increasing transmission reliability. An SM scheme transmits a plurality of data streams simultaneously, thereby increasing a data transmission rate.

When TX antennas transmit different data streams using an SM scheme, a mutual interference occurs between the simultaneously-transmitted data streams. Accordingly, a corresponding receiver detects a received signal using a Maximum Likelihood (ML) scheme considering the interference effect, or detects the received signal after removal of the interference. For example, the interference is removed using a Zero Forcing (ZF) scheme or a Minimum Mean Square Error (MMSE) scheme. In a general SM scheme, the performance of a receiver has a trade-off relationship with computational complexity of the receiver. Thus, extensive research is being conducted to provide a reception process that can approach the performance of an ML receiver while reducing the computational complexity of the receiver.

As is known in the art, an SM receiver provides good performance when a Soft DECision (SDEC) value, instead of a Hard DECision (HDEC) value, of an encoded bit is inputted to a channel decoder. The input SDEC value of the channel decoder is an estimated value of a modulated symbol transmitted over a channel, which uses a Log Likelihood Ratio (LLR) value. Therefore, an SM receiver uses not only a low-complexity reception process but also a process for generating an optimal LLR from the reception process.

Figure 1:
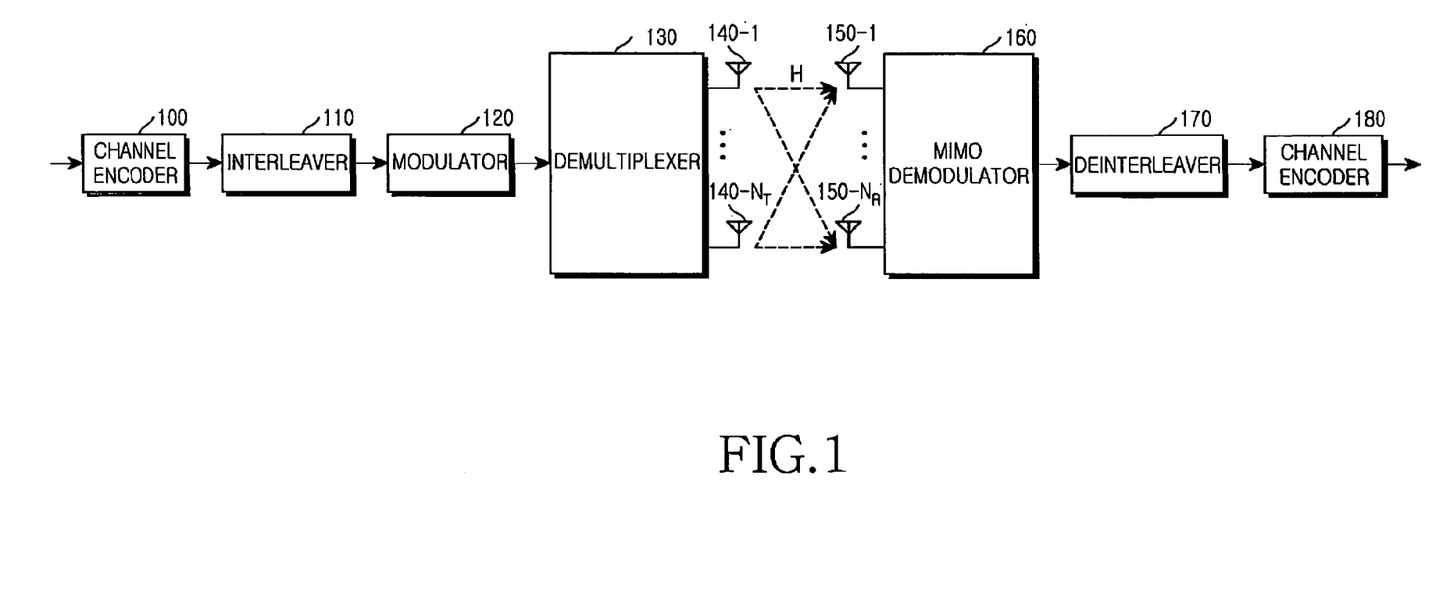
FIG. 1 is a block diagram of a transmitter and a receiver in a MIMO communication system according to the present invention.

A definition is given of a system model in consideration of a system that includes $N_T$ number of TX antennas and $N_R$ number of RX antennas as illustrated in FIG. 1. When a TX signal (or a modulated signal) to be transmitted through each TX antenna is denoted by $d_i$, an RX signal r of a receiver can be expressed as Equation (1) below. It is assumed that the signal $d_i$ transmitted through each TX antenna is an M-Quadrature Amplitude Modulation (QAM) signal. In this case, the number of encoded bits that can be simultaneously transmitted is $N_T \times \log_2(M)$.

$$r = Hd + n \tag{1}$$

where r is an RX signal vector, d is a TX symbol vector, n is an ambient Gaussian noise vector, and H is a coefficient matrix of a channel established between the TX antenna and the RX antenna. The channel coefficient matrix H is defined as Equation (2):

$$d = [d_1, d_2, d_3, \ldots, d_{N_T}]^T \tag{2}$$

$$r = [r_1, r_2, r_3, \ldots, r_{N_R}]^T$$

$$H = \begin{bmatrix} h_{11} & h_{12} & \cdots & h_{1N_R} \\ h_{21} & h_{22} & \cdots & h_{2N_R} \\ \vdots & \vdots & \cdots & \vdots \\ h_{N_T 1} & h_{N_T 2} & \cdots & h_{N_T N_R} \end{bmatrix}$$

where the channel coefficient matrix H is an $N_T \times N_R$ matrix in which an (i,j) element $h_{ij}$ denotes a channel response between the $i^{th}$ TX antenna and the $j^{th}$ RX antenna.

Signal detection methods according to the above SM scheme can be summarized as follows:

First, an ML scheme uses Equation (3) below to calculate Euclidean distances for all symbols (or signal points) within a constellation and then selects a symbol with the shortest straight distance. That is, the ML scheme determines a distance between y and Hx to determine a symbol with the shortest distance to be a symbol with the highest similarity (i.e., a symbol with the smallest error). However, the ML scheme must calculate Euclidean distances for $M^{N_T}$ (M: a modulation level) number of vectors. Therefore, the ML scheme exponentially increases in complexity and thus is difficult to implement.

$$\hat{x} = \arg\min_x \|y - Hx\|_F^2 \tag{3}$$

A Successive Interference Cancellation (SIC) scheme reconstructs HDEC values of a previous stage to remove interference from an RX signal. However, when there is an error in the HDEC values of the previous stage of the SIC scheme, the error is weighted in the next stage. In this case, the reliability of the HDEC values decreases with the progress of each subsequent stage.

Therefore, the SIC scheme needs to consider error propagation causing performance degradation. That is, because decoding operations are performed in the order of TX antenna indexes regardless of channel conditions, the interference cancellation process is performed without removal of a TX antenna with high signal strength. Thus, the performance of a TX antenna with low signal strength is not greatly improved. A Vertical Bell Labs LAyered Space-Time (V-BLAST) scheme is an improved process for solving the above problem. The V-BLAST scheme performs an interference cancellation process in the descending order of the signal strengths of TX antennas and thus has better performance than the SIC scheme.

A Modified ML (MML) scheme uses the ML scheme to decode symbols transmittable from all TX antennas except a particular TX antenna. A signal transmitted from the particular TX antenna is determined using a simple slicing function Q ( ) expressed as Equation (4) below. The MML scheme has the same performance as the ML scheme, and its computational complexity is expressed as the exponential multiplication of the subtraction of 1 from the number of the TX antennas. That is, while the ML scheme calculates Euclidean distances for $M^{N_T}$ number of vectors, the MML scheme calculates Euclidean distances for $M^{N_T-1}$ number of vectors and detects signals for the remaining symbols using the slicing function.

$$x_i = Q\left(\frac{h_i^H}{\|h_i\|^2}\left(y - \sum_{j \neq i} h_j x_j\right)\right) \quad (4)$$

A proposed Recursive MML (RMML) scheme reduces the complexity of the MML scheme. Using Givens rotation, the RMML scheme nulls a channel to generate several small channels (subsystems), and makes a decision on the minimum unit of 2×2 channels according to the MML scheme. In this manner, the RMML scheme generates several (e.g., 3×3 and 2×2) subsystems, thereby reducing the computational complexity while providing performance that approaches the performance of the ML scheme. However, the generation of several subsystems means the presence of several candidate TX vectors, which limits the complexity reduction. In addition, like the SIC scheme, the RMML scheme causes performance degradation due to error propagation because the 2×2 subsystems make an immediate decision.

Meanwhile, when ML receivers are used in an MIMO communication system using two TX antennas, the optimal LLR can be expressed as Equation (5):

$$LLR(b_{1,i}) = \log\left(\frac{\sum_{c \in C_i^+} \sum_{d_2 \in C} \exp\left(-\frac{|r - h_1 c - h_2 d_2|^2}{2\sigma^2}\right)}{\sum_{c \in C_i^-} \sum_{d_2 \in C} \exp\left(-\frac{|r - h_1 c - h_2 d_2|^2}{2\sigma^2}\right)}\right) \quad (5)$$

$$LLR(b_{2,i}) = \log\left(\frac{\sum_{c \in C_i^+} \sum_{d_1 \in C} \exp\left(-\frac{|r - h_1 d_1 - h_2 c|^2}{2\sigma^2}\right)}{\sum_{c \in C_i^-} \sum_{d_1 \in C} \exp\left(-\frac{|r - h_1 d_1 - h_2 c|^2}{2\sigma^2}\right)}\right)$$

where $b_{j,i}$ denotes the $i^{th}$ bit of the $j^{th}$ antenna, $C_i^+$ denotes a set of $d_i$'s whose $i^{th}$ bit is '+1', and $C_i^-$ denotes a set of $d_i$'s whose $i^{th}$ bit is '−1'.

As can be seen from Equation (5), because Euclidean distances must be calculated with respect to all possible combinations of TX signals, the LLR calculation in the ML receiver is difficult to implement for a modulation scheme with a high modulation level or many antennas.

A receiver structure is therefore needed that can implement an SM scheme with high reliability similar to that of an LLR in an ML scheme while having low complexity.

SUMMARY OF THE INVENTION

The present invention substantially solves at least the above problems and/or disadvantages and provides at least the advantages below. Accordingly, an aspect of the present invention is to provide a receiving apparatus and method for generating an LLR with high reliability at low complexity in an SM communication system.

Another aspect of the present invention is to provide a receiving apparatus and method for providing performance similar to that of an ML scheme in an SM communication system.

According to one aspect of the present invention, a receiver for an SM communication system includes a determiner for performing an MML decoding operation in an ascending or descending order of TX antennas to estimate a plurality of candidate TX vectors; a distance calculator for calculating a Euclidean distance for each of the candidate TX vectors from the determiner; and an LLR calculator for calculating LLRs using the Euclidean distances from the distance calculator.

According to another aspect of the present invention, a receiver for an MIMO communication system using two TX antennas includes a first LLR generator for determining a second TX symbol by an MML scheme with respect to each of the TX symbols transmittable from a first TX antenna to estimate a plurality of candidate TX vectors, and calculating LLRs for a first TX symbol using the candidate TX vectors; and a second LLR generator for determining the first TX symbol by an MML scheme with respect to each of the TX symbols transmittable from the second TX antenna to estimate a plurality of candidate TX vectors, and calculating LLRs for the second TX symbol using the candidate TX vectors.

According to still another aspect of the present invention, a receiving method for an SM communication system includes performing an MML decoding operation in the ascending or descending order of TX antennas to estimate a plurality of candidate TX vectors; calculating a Euclidean distance for each of the estimated candidate TX vectors; and calculating LLRs using the calculated Euclidean distances.

According to yet another aspect of the present invention, a receiving method for an MIMO communication system using two TX antennas includes a first LLR generation step for determining a second TX symbol by an MML scheme with respect to each of the TX symbols transmittable from the first TX antenna to estimate a plurality of candidate TX vectors, and calculating LLRs for a first TX symbol using the candidate TX vectors; and a second LLR generation step for determining the first TX symbol by an MML scheme with respect to each of the TX symbols transmittable from a second TX antenna to estimate a plurality of candidate TX vectors, and calculating LLRs for the second TX symbol using the candidate TX vectors.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail since they would obscure the invention in unnecessary detail. Also, the terms used herein are defined according to the functions of the present invention. Thus, the terms may vary depending on user's or operator's intension and usage. Therefore, the terms used herein must be understood based on the descriptions made herein.

A description will now be given of an apparatus and method for generating a high-reliability LLR in a Spatial Multiplexing (SM) communication system according to the present invention.

In the following description of FIGS. 1 through 5, it is assumed that channel values $h_{ij}$ are precalculated by a channel estimator (not illustrated). It is also assumed that the communication system has two TX antennas (i.e., $N_T$=2).

FIG. 1 shows a transmitter and a receiver in a Multiple-Input Multiple-Output (MIMO) communication system according to the present invention.

Referring to FIG. 1, the transmitter includes a channel encoder 100, an interleaver 110, a modulator 120, a demultiplexer 130, and a plurality of TX antennas 140-1 through 140-$N_T$. The receiver includes a plurality of RX antennas 150-1 through 150-$N_R$, an MIMO demodulator 160, a deinterleaver 170, and a channel decoder 180.

The channel encoder 100 of the transmitter encodes a target data bit stream at a given coding rate to output code symbols. When the number of the input data bits is k and the coding rate is R, the number of the output symbols is k/R. For example, the channel encoder 100 may be a convolutional encoder, a turbo encoder, or a Low-Density Parity Check (LDPC) encoder.

The interleaver 110 interleaves the output symbols of the channel encoder 100 according to a rule providing robustness against a burst error.

The modulator 120 modulates the interleaved symbols from the interleaver 110 according to a coding scheme. That is, the modulator 120 maps signal points to a constellation according to a mapping scheme to output complex signals. Examples of the coding scheme are a Binary Phase Shift-Keying (BPSK) scheme mapping one bit (s=1) to one complex signal, a Quadrature Phase-Shift Keying (QPSK) scheme mapping two bits (s=2) to one complex signal, an 8ary Quadrature Amplitude Modulation (8 QAM) scheme mapping three bits (s=3) to one complex signal, and a 16 QAM scheme mapping four bits (s=4) to one complex signal.

The demultiplexer 130 demultiplexes the complex signals from the modulator 120 and transmits the resulting signals through $N_T$ TX antennas. Although not illustrated, when the transmitter uses an Orthogonal Frequency Division Multiplexing (OFDM) communication scheme, a plurality of signal streams outputted from the demultiplexer 130 are OFDM-modulated. The OFDM-modulated signals are Radio Frequency (RF)-processed to be suitable for over-the-air transmission, and the resulting RF signals are transmitted over the air through the corresponding TX antennas. Because the number of the TX antennas is assumed to be two, a TX vector can be expressed as d=[$d_1$ $d_2$].

Meanwhile, the RX antennas 150-1 through 150-$N_R$ of the receiver receive the RF signals from the TX antennas 140-1 through 140-$N_T$. Although not illustrated, the received RF signals received through the TX antennas 140-1 through 140-$N_T$ are converted into baseband sample data, the resulting sample data are OFDM-demodulated and are then inputted to the MIMO demodulator 160. At this point, it is assumed that an RX vector inputted to the MIMO demodulator 160 is r=[$r_1$ $r_2$ ... $r_N$].

The MIMO demodulator 160 estimates candidate TX vectors by MML-decoding each of two TX symbols received from the transmitter, calculates Euclidean distances for the respective candidate RX vectors, and calculates LLRs using the calculated Euclidean distances. The structure and operation of the MIMO demodulator 160 will be described later with reference to FIGS. 2 through 5.

The deinterleaver 170 deinterleaves the LLRs from the MIMO demodulator 160 according to a given rule. The channel decoder 180 soft decision decodes the deinterleaved LLRs from the deinterleaver 170 to recover the data bit stream.

Figure 2A:
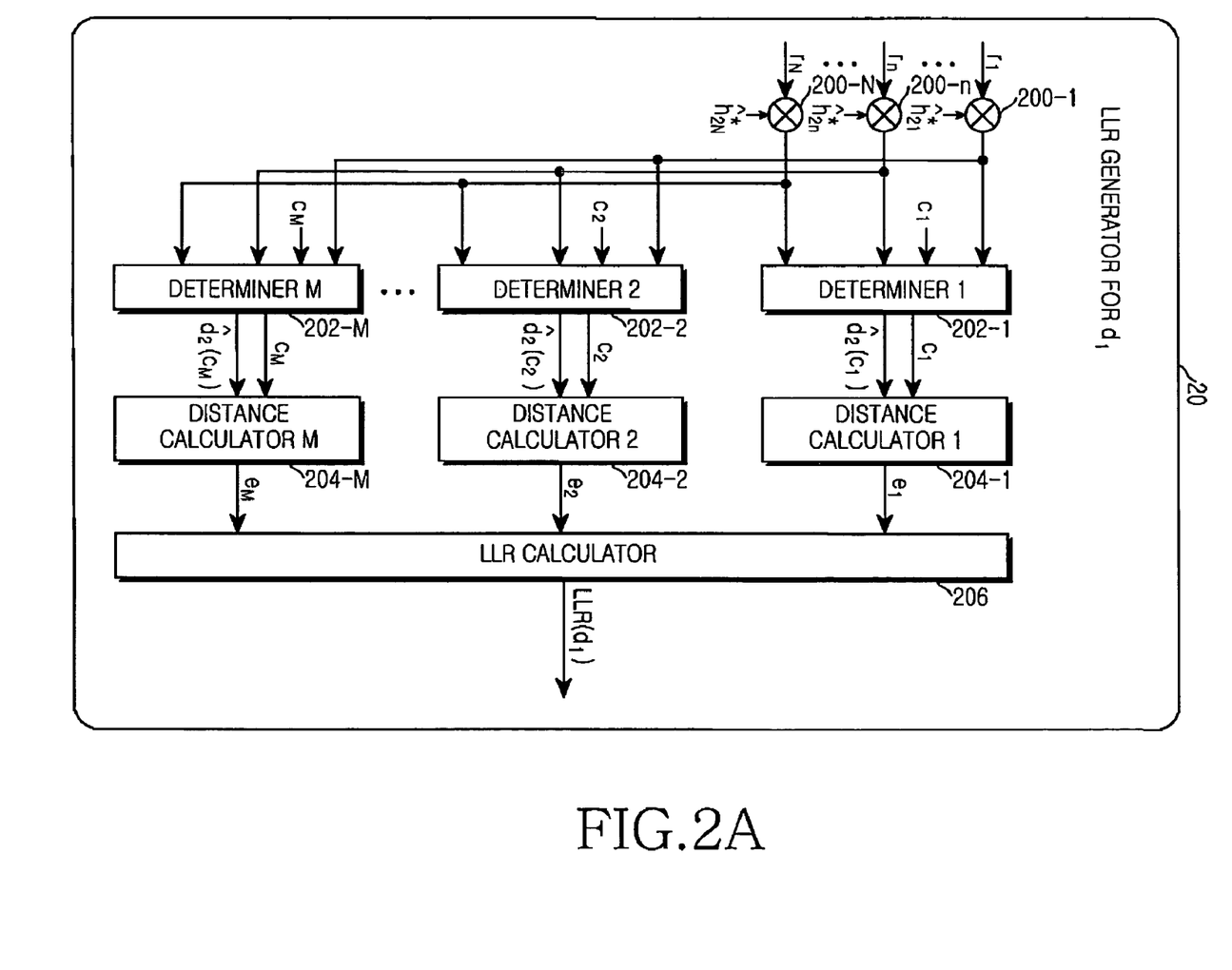
FIGS. 2A and 2B are block diagrams of a MIMO demodulator illustrated in FIG. 1.
Figure 2B:
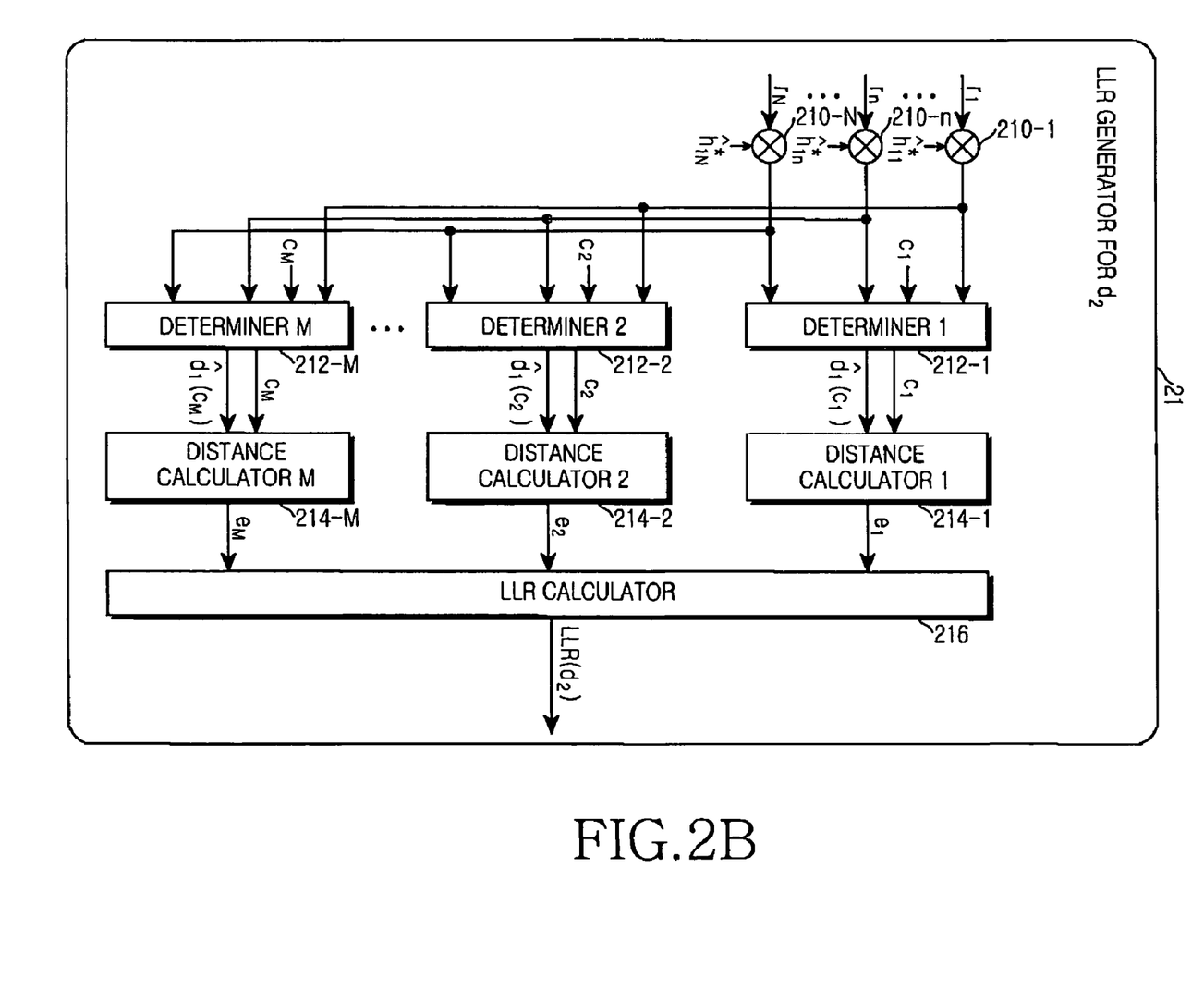

FIGS. 2A and 2B shows the MIMO demodulator 160 illustrated in FIG. 1. The MIMO demodulator 160 includes a first LLR generator 20 for generating an LLR for the first TX symbol $d_1$ and a second LLR generator 21 for generating an LLR for the second TX symbol $d_2$. Each of the first and second LLR generators 20 and 21 includes a plurality of multipliers, a plurality of determiners, a plurality of distance calculators, and an LLR calculator. The first and second LLR generators 20 and 21 have the same structure and thus the following description will focus on the first LLR generator 20 for conciseness.

In the first LLR generator 20, each of multipliers 200-1 through 200-N multiplies a channel conjugate value between the second TX antenna and the corresponding RX antenna by an RX signal of the corresponding RX antenna. For example, the multiplier 200-1 corresponding to the first RX antenna multiplies a channel conjugate value $h^*_{21}$ between the second TX antenna and the first RX antenna by an RX signal $r_1$ of the first RX antenna.

On the assumption that the first TX symbol transmitted through the first TX antenna is $c_m$ (m=1, 2, ..., M), each of determiners 202-1 through 202-M determines the remaining second TX symbol by an MML scheme (or a slicing scheme) to estimate the $m^{th}$ candidate TX vector. M denotes a modulation level (or a modulation order). Structures and operations of the determiners 202-1 through 202-M will be described later with reference to FIG. 3.

Each of distance calculators 204-1 through 204-M calculates a Euclidean distance for a candidate TX vector from the corresponding determiner. Structures and operations of the distance calculators 204-1 through 204-M will be described later with reference to FIG. 4.

An LLR calculator 206 calculates an LLR for each of coded bits of the first TX symbol (modulated symbol) by using the M Euclidean distances from the distance calculators 204-1 through 204-M. When a 16 QAM scheme is used as a modulation scheme, the LLR calculator 206 calculates an LLR for each of 4 coded bits. For example, the LLR calculator 206 may calculate the LLR using a log-MAP (maximum a posteriori) process or a max log-MAP process. Each of the above process will be described later with reference to FIG. 5.

Figure 3:
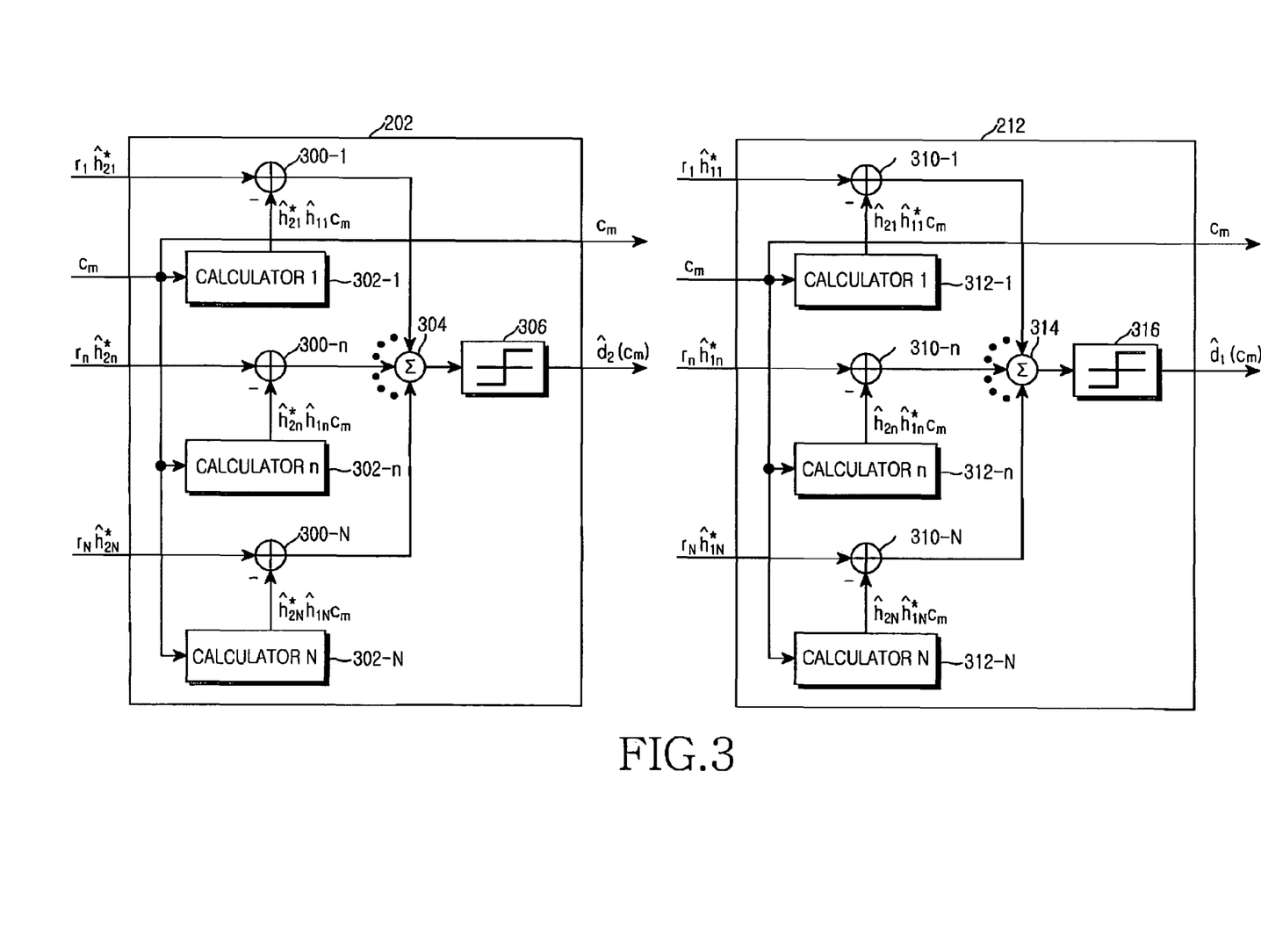
FIG. 3 is a block diagram of a determiner illustrated in FIGS. 2A and 2B.

FIG. 3 shows each of the determiners 202 and 212 illustrated in FIGS. 2A and 2B. The determiner 202 of the first LLR generator 20 and the determiner 212 of the second LLR generator 21 have the same structure. Thus, the following description will focus on the determiner 202 for conciseness.

Referring to FIG. 3, the determiner 202 includes a plurality of subtractors 300-1 through 300-N, a plurality of calculators 302-1 through 302-N, an adder 304, and a hard decider 306.

Using precalculated channel values and a symbol (modulated symbol) for a corresponding signal point, the first calculator 302-1 performs a functional operation expressed as Equation (6):

$$\hat{h}^*_{21}\hat{h}_{11}c_m \qquad (6)$$

where $\hat{h}_{ij}$ denotes a channel value between the $i^{th}$ TX antenna and the $j^{th}$ RX antenna, and $c_m$ denotes a symbol corresponding to the $m^{th}$ signal point.

In this manner, the first calculator 302-1 corresponding to the first RX antenna multiplies a channel conjugate value $\hat{h}^*_2$, between the second TX antenna and the first RX antenna, a channel value $\hat{h}_{21}$ between the first TX antenna and the first TX antenna, and a symbol $c_m$ corresponding to the first signal point.

The first subtractor 300-1 subtracts the output signal of the first calculator 302-1 from the output signal of the multiplier 200-1.

Using precalculated channel values and a symbol for a corresponding signal point, the $n^{th}$ calculator 302-$n$ performs a functional operation as expressed in Equation (6). At this point, because the $n^{th}$ calculator 302-$n$ corresponds to the $n^{th}$ RX antenna, a channel conjugate value $\hat{h}^*_{2n}$ between the second TX antenna and the $n^{th}$ RX antenna and a channel value $\hat{h}_{1n}$ between the first TX antenna and the $n^{th}$ TX antenna are used in Equation (6). The $n^{th}$ subtractor 300-$n$ subtracts the output signal of the $n^{th}$ calculator 302-$n$ from the output signal of the multiplier 200-$n$.

Likewise, the $N^{th}$ calculator 302-N and the $N^{th}$ subtractor 300-N perform the corresponding functional operations as stated above.

The adder 304 adds the output signals of the subtractors 300-1 through 300-N. The hard decider 306 hard-decides the output signal of the adder 304 to output a hard-decision value. This hard-decision value is an estimated value of the second TX symbol when the first TX symbol is $c_m$.

In this manner, the determiners 202-1 through 202-M determines the second TX symbol by an MML scheme on the assumption that the first TX symbol is a symbol for a corresponding signal point. At this point, with respect to all the signals ($d_1 = c_m \in C$) transmittable from the first TX antenna, a TX signal transmitted from the second TX antenna can be determined using Equation (7):

$$d_i = Q\left(\frac{h_i^H}{\|h_i\|^2}\left(r - \sum_{j \neq i} h_j d_j\right)\right) \qquad (7)$$

Likewise, for all the signals $c_m$ transmittable from the second TX antenna, a TX vector estimated by the determiner 212 can be expressed as Equation (8):

$$[d_1 \quad d_2]^T = [d_1(c_m) \quad c_m]^T = \left[Q\left(\frac{h_1^H}{\|h_1\|^2}(r - h_2 c_m)\right)c_m\right]^T \qquad (8)$$

Figure 4:
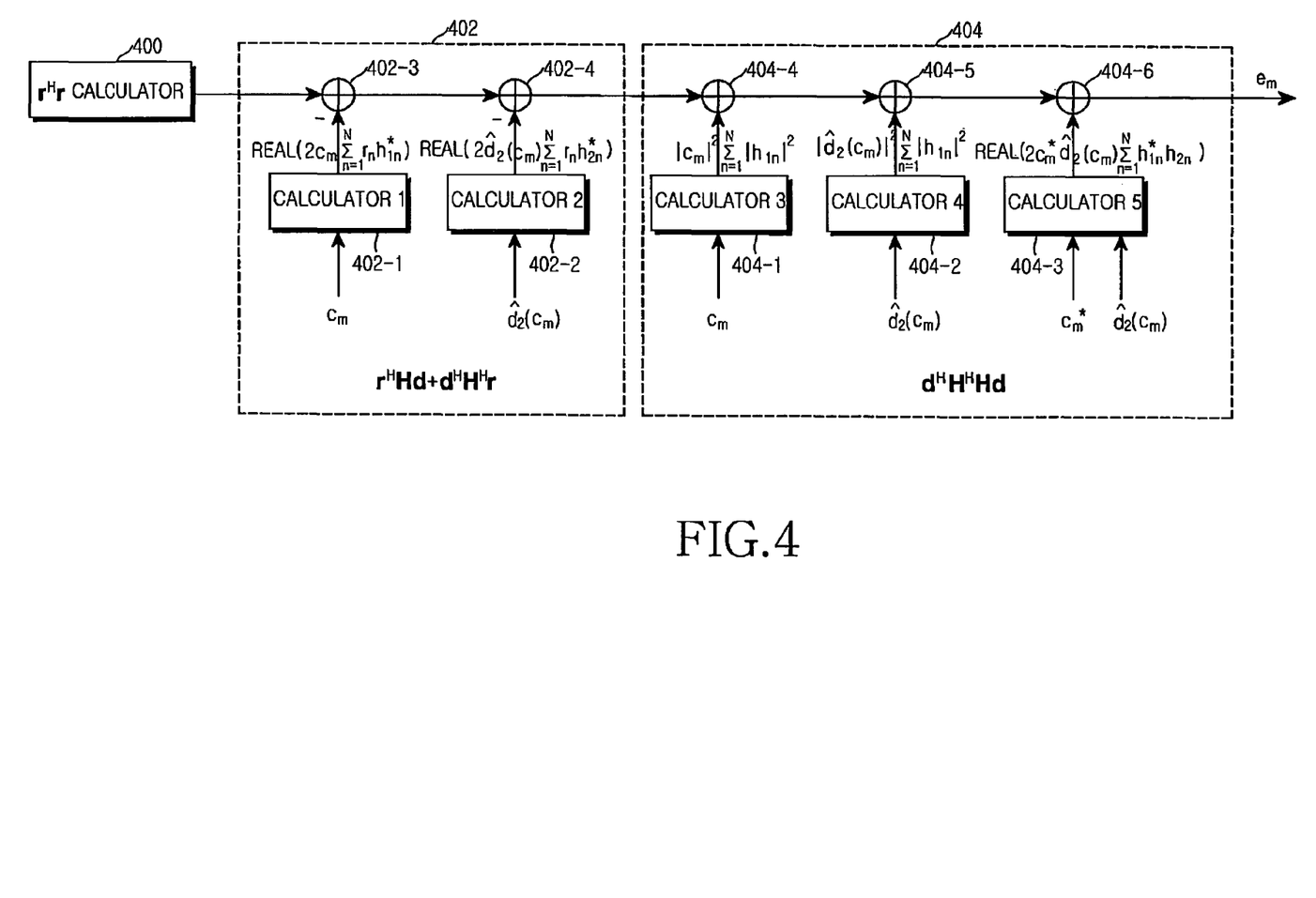
FIG. 4 is a block diagram of a distance calculator illustrated in FIGS. 2A and 2B.

FIG. 4 shows each of the distance calculators 204 and 214 illustrated in FIGS. 2A and 2B. The distance calculator 204 of the first LLR generator 20 and the distance calculator 214 of the second LLR generator 21 have the same structure. Thus, the following description will focus on the distance calculator 204 for conciseness.

Referring to FIG. 4, the distance calculator 204 includes a first calculator 400, a second calculator 402, and a third calculator 404.

The distance calculator 204 calculates a Euclidean distance using Equation (9):

$$e_m = \|r - Hd\|^2 \qquad (9)$$

Equation (9) can be developed as Equation (10):

$$\begin{aligned} e_m &= (r - Hd)^H(r - Hd) \\ &= (r^H - d^H H^H)(r - Hd) \\ &= r^H r - (r^H Hd + d^H H^H r) + d^H H^H Hd \end{aligned} \qquad (10)$$

The first calculator 400 squares the absolute values of N RX signals received from N RX antennas, and adds the squared absolute values. The second calculator 402 calculates $(r^H Hd + d^H H^H r)$ using the candidate TX vector $(c_m, \hat{d}_2(c_m))$ from the corresponding determiner 202 and the precalculated channel values $(h_{1n}, h_{2n})$. Thereafter, the second calculator 402 subtracts the calculated value $(r^H Hd + d^H H^H r)$ from the output value of the first calculator 400.

The second calculator 402 includes a first calculator 402-1, a second calculator 402-2, a first subtractor 402-3, and a second subtractor 402-4.

The first calculator 402-1 performs a functional operation expressed as Equation (11):

$$\text{real}\left(2c_m \sum_{n=1}^{N} r_n h^*_{1n}\right) \qquad (11)$$

where real( ) denotes a function for selecting a real part from a function value of ( ).

The second calculator 402-2 performs a functional operation expressed as Equation (12):

$$\text{real}\left(2\hat{d}_2(c_m) \sum_{n=1}^{N} r_n h^*_{2n}\right) \qquad (12)$$

The first subtractor 402-3 subtracts the output value of the first calculator 402-1 from the output value of the first calculator 400. The second subtractor 402-4 subtracts the output value of the second calculator 402-2 from the output value of the first subtractor 402-3.

The third calculator 404 calculates $(d^H H^H Hd)$ using the candidate TX vector $(c_m, \hat{d}_2(c_m))$ from the corresponding determiner 202 and the precalculated channel values $(h_{1n}, h_{2n})$. Thereafter, the third calculator 404 adds the calculated value $(d^H H^H Hd)$ and the output value of the second calculator 402 to output a calculated distance value $e_m$ corresponding to the $m^{th}$ signal point.

The third calculator 404 includes a third calculator 404-1, a fourth calculator 404-2, a fifth calculator 404-3, and a first adder 404-4, a second adder 404-5, and a third adder 404-6.

The third calculator 404-1 performs a functional operation expressed as Equation (13):

$$|c_m|^2 \sum_{n=1}^{N} |h_{1n}|^2 \quad (13)$$

The fourth calculator 404-2 performs a functional operation expressed as Equation (14):

$$|\hat{d}_2(c_m)|^2 \sum_{n=1}^{N} |h_{1n}|^2 \quad (14)$$

The fifth calculator 404-3 performs a functional operation expressed as Equation (15):

$$\text{real}\left(2c_m^* \hat{d}_2(c_m) \sum_{n=1}^{N} h_{1n}^* h_{2n}\right) \quad (15)$$

The first adder 404-4 adds the output value of the second calculator 402 and the output value of the third calculator 404-1. The second adder 404-5 adds the output value of the first adder 404-4 and the output value of the fourth calculator 404-2. The third adder 404-6 adds the output value of the second adder 404-5 and the output value of the fifth calculator 404-3 to output a calculated distance value $e_m$ corresponding to the $m^{th}$ signal point.

After the above calculation of M distance values for the first TX symbol and M distance values for the second TX symbol, LLRs are calculated using a log-MAP process. The LLRs can be calculated using Equation (16):

$$LLR(b_{1,i}) = \log\left(\frac{\sum_{c \in C_i^+} \exp\left(-\frac{|r - h_1 c - h_2 d_2(c)|^2}{2\sigma^2}\right)}{\sum_{c \in C_i^-} \exp\left(-\frac{|r - h_1 c - h_2 d_2(c)|^2}{2\sigma^2}\right)}\right) \quad (16)$$

$$LLR(b_{2,i}) = \log\left(\frac{\sum_{c \in C_i^+} \exp\left(-\frac{|r - h_1 d_1(c) - h_2 c|^2}{2\sigma^2}\right)}{\sum_{c \in C_i^-} \exp\left(-\frac{|r - h_1 d_1(c) - h_2 c|^2}{2\sigma^2}\right)}\right)$$

Figure 5A:
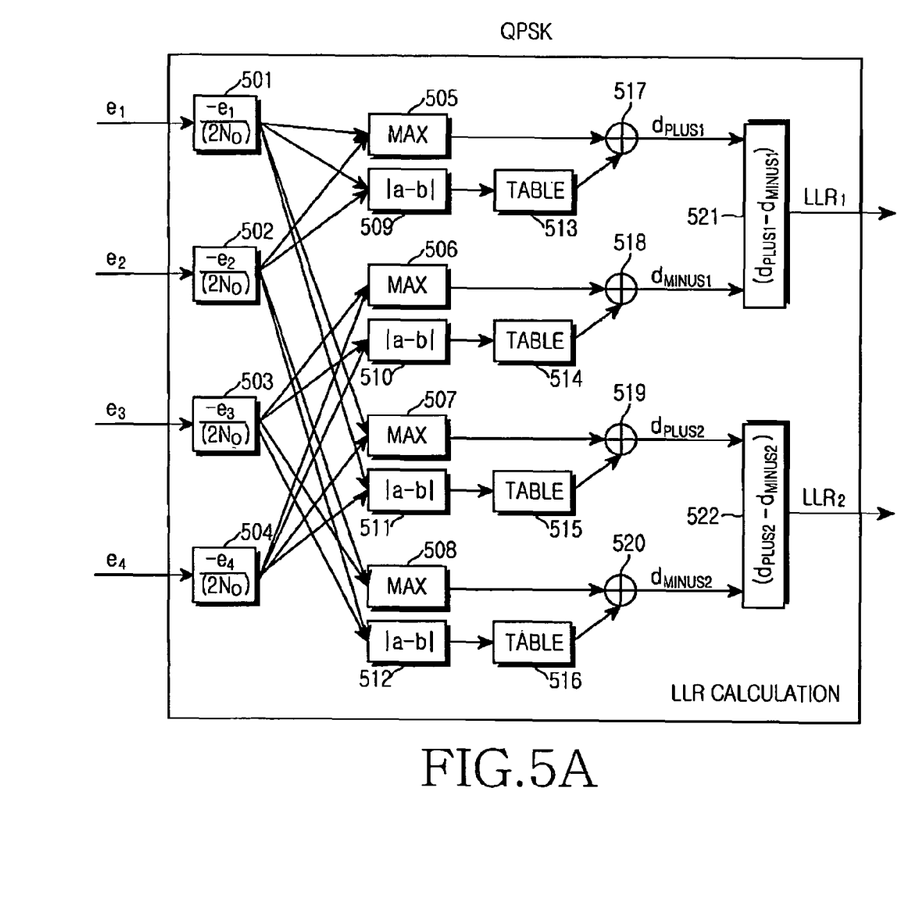
FIGS. 5A and 5B are block diagrams of an LLR calculator illustrated in FIGS. 2A and 2B.
Figure 5B:
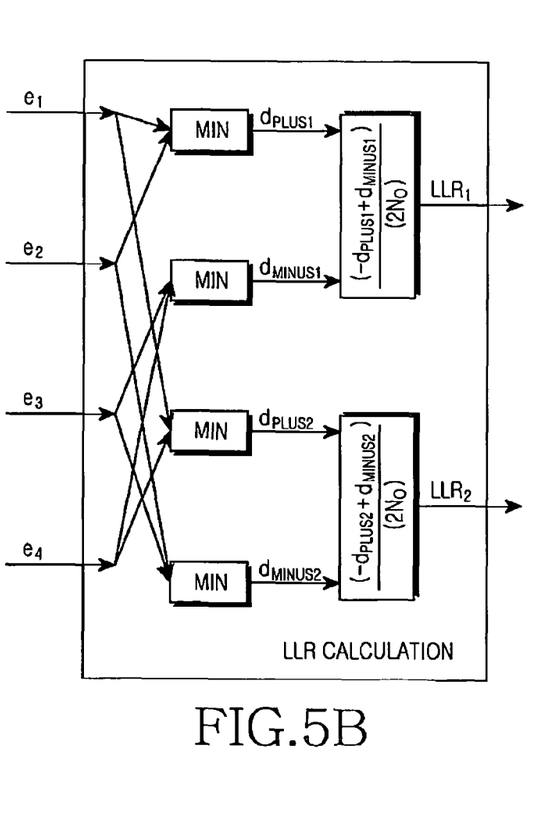

FIGS. 5A and 5B show each of the LLR calculators 206 and 216 according to Equation (16). FIG. 5A shows a log-MAP architecture using a Jacobian log table, and FIG. 5B shows an architecture corresponding to the approximation of Equation (16). These architectures are already known in the art and thus only the log-MAP architecture will be described in brief.

For calculation of an LLR according to a QPSK scheme, each of calculators 501 through 504 uses an input distance value $e_m$ to perform a functional operation expressed as Equation (17):

$$\frac{-e_m}{2N_o} \quad (17)$$

Each of maximum selectors 505 through 508 selects the larger of two input values from the corresponding two calculators. Each of absolute calculators 509 through 512 calculates a difference between two input values from the corresponding two calculators and calculates an absolute value of the difference.

Each of tables 513 through 516 obtains a log value corresponding to the output value of the corresponding absolute calculator by using a Jacobian log table. Each of adders 517 through 520 adds the output value of the corresponding absolute calculator and the output value of the corresponding table.

A first calculator 521 subtracts an output value 'minus2' of the second adder 518 from an output value 'plus1' of the first adder 517 to output an $LLR_1$ for the first of two bits of a QPSK signal. A second calculator 522 subtracts an output value 'minus2' of the fourth adder 520 from an output value 'plus2' of the third adder 519 to output an $LLR_2$ for the second of the two bits of the QPSK signal.

Figure 6:
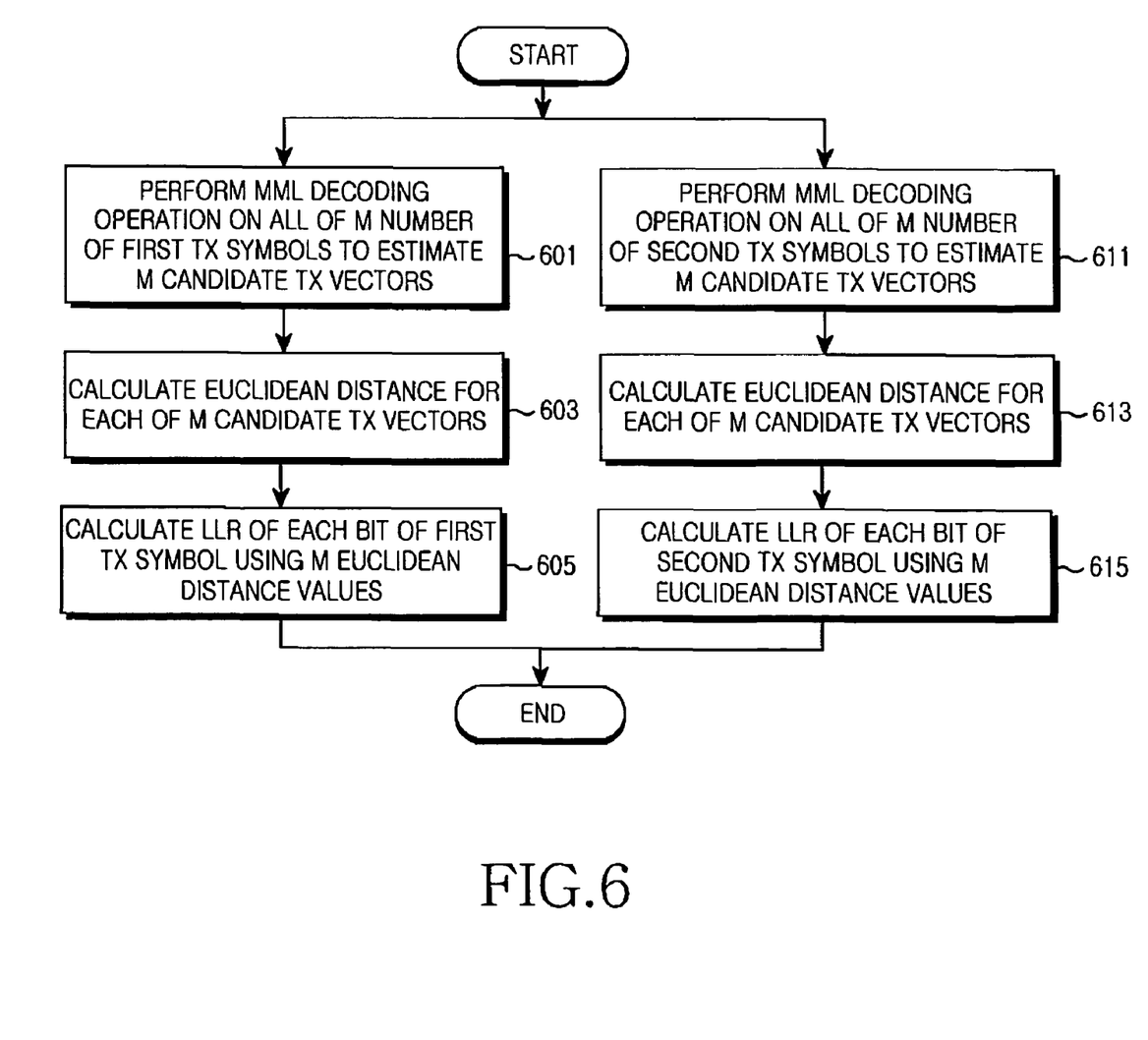
FIG. 6 is a flowchart illustrating a procedure for generating LLRs inputted to a channel decoder in a MIMO communication system according to the present invention.

FIG. 6 shows a procedure for generating LLRs inputted to the channel decoder in the MIMO communication system according to the present invention. The following description will be made on the assumption that the number of TX antennas is 2. In FIG. 6, steps 601 through 605 are processes for generating an LLR of the first TX symbol and steps 611 through 615 are processes for generating an LLR of the second TX symbol.

Referring to FIG. 6, with respect to all the signals ($d_1 = c_m \in C$) transmittable from the first TX antenna, the receiver determines a signal transmitted from the second TX antenna by Equation (6) to estimate M candidate TX vectors, in step 601. In step 603, the receiver calculates a Euclidean distance for each of the M candidate TX vectors to obtain M distance values. In step 605, using the M distance values, the receiver performs a log-MAP process to calculate an LLR for each bit (coded bit) of the first TX vector.

Meanwhile, with respect to all the signals ($d_2 = c_m \in C$) transmittable from the second TX antenna, the receiver determines a signal transmitted from the first TX antenna by Equation (6) to estimate M candidate TX vectors, in step 611. In step 613, the receiver calculates a Euclidean distance for each of the M candidate TX vectors to obtain M distance values. In step 615, using the M distance values, the receiver performs a log-MAP process to calculate an LLR for each bit (coded bit) of the second TX vector.

In this manner, the receiver calculates LLR values for two TX symbols transmitted from the transmitter. In the case of a QPSK scheme, because 2 LLR values are calculated for each TX symbol, the receiver provides a total of 4 LLR values to the channel decoder.

As described above, the present invention can generate the LLR with high reliability at low complexity in an MIMO communication system. In particular, the present invention can generate the LLR with high reliability at low complexity in an MIMO communication system using two TX antennas.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A receiver for a Spatial Multiplexing (SM) communication system, the receiver comprising:
   a determiner for performing a Modified Maximum Likelihood (MML) decoding operation in an ascending or descending order of transmit (TX) antennas to estimate a plurality of candidate TX vectors;

a distance calculator for calculating a Euclidean distance for each of the candidate TX vectors from the determiner; and a Log Likelihood Ratio (LLR) calculator for calculating LLRs using the Euclidean distances from the distance calculator, wherein when a number of TX antennas is 2, on an assumption that an $i^{th}$ TX symbol transmitted from an $i^{th}$ TX antenna is $c_m$ (m=1, 2, ..., M), the determiner determines a $j^{th}$ TX symbol $d_j$ to estimate the candidate TX vectors using $$d_j = Q\left(\frac{h_j^H}{\|h_j\|^2}(r - h_i d_i)\right),$$

where h denotes a channel vector, r denotes a receive (RX) vector, and Q( ) denotes a slicing function.

2. The receiver of claim 1, wherein when the candidate TX vector, a channel value between an $i^{th}$ TX antenna and a $j^{th}$ receive (RX) antenna, and the RX symbol of the $n^{th}$ RX antenna are respectively ($c_m$, $\hat{d}_2(c_m)$), $\hat{h}_{ij}$, and $r_n$, and the distance calculator comprises:

a first calculator for calculating $r^H r$;

a second calculator for calculating $$\text{real}\left(2c_m \sum_{n=1}^{N} r_n h_{1n}^*\right);$$

a third calculator for calculating $$\text{real}\left(2\hat{d}_2(c_m) \sum_{n=1}^{N} r_n h_{2n}^*\right);$$

a fourth calculator for calculating $$|c_m|^2 \sum_{n=1}^{N} |h_{1n}|^2;$$

a fifth calculator for calculating $$|\hat{d}_2(c_m)|^2 \sum_{n=1}^{N} |h_{1n}|^2;$$

a sixth calculator for calculating $$\text{real}\left(2c_m^* \hat{d}_2(c_m) \sum_{n=1}^{N} h_{1n}^* h_{2n}\right);$$

a subtractor for subtracting the output values of the second and third calculators from the output value of the first calculator; and an adder for adding the output value of the subtractor and the output values of the fourth through sixth calculators to generate a Euclidean distance value when the candidate TX vector is ($c_m$, $\hat{d}_2(c_m)$).

3. The receiver of claim 1, wherein the LLR calculator calculates the LLRs using one of a log-MAP (maximum a posteriori) process and a max log-MAP process.

4. The receiver of claim 1, further comprising:

a deinterleaver for deinterleaving the LLRs from the LLR calculator; and a channel decoder for soft-decision decoding the deinterleaved LLRs from the deinterleaver to recover a data bit stream.

5. A receiver for a Multiple-Input Multiple-Output (MIMO) communication system using two transmit (TX) antennas, the receiver comprising:

a first Log Likelihood Ratio (LLR) generator for determining a second TX symbol by a Modified Maximum Likelihood (MML) scheme with respect to each of the TX symbols transmittable from a first TX antenna to estimate a plurality of candidate TX vectors, and calculating LLRs for a first TX symbol using the candidate TX vectors; and a second LLR generator for determining the first TX symbol by an MML scheme with respect to each of the TX symbols transmittable from a second TX antenna to estimate a plurality of candidate TX vectors, and calculating LLRs for the second TX symbol using the candidate TX vectors, wherein each of the first and second LLR generators comprises a determiner for determining remaining TX symbols by a slicing scheme on an assumption that a corresponding TX symbol is $c_m$ (m=1, 2, ..., M) to generate M (a modulation level) number of candidate TX vectors, and wherein on an assumption that an $i^{th}$ TX symbol transmitted from an $i^{th}$ TX antenna is $c_m$ (m=1, 2, ..., M), the determiner determines a $j^{th}$ TX symbol $d_j$ to estimate the candidate TX vectors using $$d_j = Q\left(\frac{h_j^H}{\|h_j\|^2}(r - h_i d_i)\right),$$

where h denotes a channel vector, r denotes a receive (RX) vector, and Q( ) denotes a slicing function.

6. The receiver of claim 5, wherein each of the first and second LLR generators further comprises:

a distance calculator for calculating a Euclidean distance for each of the M candidate TX vectors from the determiner; and an LLR calculator for calculating LLRs using the M Euclidean distances from the distance calculator.

7. The receiver of claim 6, wherein when the candidate TX vector, a channel value between an $i^{th}$ TX antenna and a $j^{th}$ receive (RX) antenna, and the RX symbol of the $n^{th}$ RX antenna are respectively ($c_m$, $\hat{d}_2(c_m)$), $\hat{h}_{ij}$, and $r_n$, and the distance calculator comprises:

a first calculator for calculating $r^H r$;

a second calculator for calculating $$\text{real}\left(2c_m \sum_{n=1}^{N} r_n h_{1n}^*\right);$$

a third calculator for calculating $$\text{real}\left(2\hat{d}_2(c_m) \sum_{n=1}^{N} r_n h_{2n}^*\right);$$

a fourth calculator for calculating $$|c_m|^2 \sum_{n=1}^{N} |h_{1n}|^2;$$

a fifth calculator for calculating $$|\hat{d}_2(c_m)|^2 \sum_{n=1}^{N} |h_{1n}|^2;$$

a sixth calculator for calculating $$\text{real}\left(2c_m^* \hat{d}_2(c_m) \sum_{n=1}^{N} h_{1n}^* h_{2n}\right);$$

a subtractor for subtracting the output values of the second and third calculators from an output value of the first calculator; and
an adder for adding an output value of the subtractor and output values of the fourth through sixth calculators to generate a Euclidean distance value when the candidate TX vector is $(c_m, \hat{d}_2(c_m))$.

8. The receiver of claim 6, wherein the LLR calculator calculates the LLRs using one of a log-MAP (maximum a posteriori) process and a max log-MAP process.

9. The receiver of claim 5, further comprising:
a deinterleaver for deinterleaving the LLRs from the first and second LLR generators; and
a channel decoder for soft-decision decoding the deinterleaved LLRs from the deinterleaver to recover a data bit stream.

10. A receiving method for a Spatial Multiplexing (SM) communication system including a demodulator, the method comprising the steps of:
performing, by the demodulator, a Modified Maximum Likelihood (MML) decoding operation in the ascending or descending order of transmit (TX) antennas to estimate a plurality of candidate TX vectors;
calculating a Euclidean distance for each of the estimated candidate TX vectors; and
calculating Log Likelihood Ratios (LLRs) using the calculated Euclidean distances,
wherein when a number of TX antennas is 2, on an assumption that an $i^{th}$ TX symbol transmitted from an $i^{th}$ TX antenna is $c_m$ (m=1, 2, . . . , M), a $j^{th}$ TX symbol $d_j$ is determined to estimate the candidate TX vectors using $$d_j = Q\left(\frac{h_j^H}{\|h_j\|^2}(r - h_i d_i)\right),$$

where h denotes a channel vector, r denotes a receive (RX) vector, and Q( ) denotes a slicing function.

11. The receiving method of claim 10, wherein when the candidate TX vector, a channel value between an $i^{th}$ TX antenna and a $j^{th}$ receive (RX) antenna, and the RX symbol of the $n^{th}$ RX antenna are respectively $(c_m, \hat{d}_2(c_m))$, $\hat{h}_{ij}$, and $r_n$, the step of calculating the Euclidean distance comprises:
calculating $r^H r$ and storing the same as a first value;
calculating $$\text{real}\left(2c_m \sum_{n=1}^{N} r_n h_{1n}^*\right)$$

and storing the same as a second value;
calculating $$\text{real}\left(2\hat{d}_2(c_m) \sum_{n=1}^{N} r_n h_{2n}^*\right)$$

and storing the same as a third value;
calculating $$|c_m|^2 \sum_{n=1}^{N} |h_{1n}|^2$$

and storing the same as a fourth value;
calculating $$|\hat{d}_2(c_m)|^2 \sum_{n=1}^{N} |h_{1n}|^2$$

and storing the same as a fifth value;
calculating $$\text{real}\left(2c_m^* \hat{d}_2(c_m) \sum_{n=1}^{N} h_{1n}^* h_{2n}\right)$$

and storing the same as a sixth value;
subtracting the second and third values from the first value; and
adding a subtraction value from the previous step and the fourth through sixth values to generate a Euclidean distance value when the candidate TX vector is $(c_m, \hat{d}_2(c_m))$.

12. The receiving method of claim 10, wherein the LLRs are calculated using one of a log-MAP (maximum a posteriori) process and a max log-MAP process.

13. The receiving method of claim 10, further comprising:
deinterleaving the calculated LLRs; and soft-decision decoding the deinterleaved LLRs to recover a data bit stream.

14. A receiving method for a Multiple-Input Multiple-Output (MIMO) communication system using two transmit (TX) antennas, the method comprising the steps of:
a first Log Likelihood Ratio (LLR) generation step, by a first LLR calculator, for determining a second TX symbol by a Modified Maximum Likelihood (MML) scheme with respect to each of the TX symbols transmittable from a first TX antenna to estimate a plurality of candidate TX vectors, and calculating LLRs for a first TX symbol using the candidate TX vectors; and
a second LLR generation step, by a second LLR calculator, for determining the first TX symbol by an MML scheme with respect to each of the TX symbols transmittable from a second TX antenna to estimate a plurality of candidate TX vectors, and calculating LLRs for the second TX symbol using the candidate TX vectors,
wherein each of the first and second LLR generation steps comprises determining the remaining TX symbols by a slicing scheme on an assumption that a corresponding TX symbol is $c_m$ (m=1, 2, ..., M) to estimate M (a modulation level) number of candidate TX vectors, and
wherein on an assumption that an $i^{th}$ TX symbol transmitted from an $i^{th}$ TX antenna is $c_m$ (m=1, 2, ..., M), a $j^{th}$ TX symbol $d_j$ are determined to estimate the candidate TX vectors using $$d_j = Q\left(\frac{h_j^H}{\|h_j\|^2}(r - h_i d_i)\right),$$

where h denotes a channel vector, r denotes a receive (RX) vector, and Q( ) denotes a slicing function.

15. The receiving method of claim 14, wherein each of the first and second LLR generation steps further comprises:
calculating a Euclidean distance for each of the M candidate TX vectors; and
calculating LLRs using the M Euclidean distances.

16. The receiving method of claim 15, wherein when the candidate TX vector, a channel value between the $i^{th}$ TX antenna and a $j^{th}$ receive (RX) antenna, and the RX symbol of the $n^{th}$ RX antenna are respectively $(c_m, \hat{d}_2(c_m))$, $h_{ij}$, and $r_n$, the step of calculating the Euclidean distance comprises:
calculating $r^H r$ and storing the same as a first value;
calculating $$\text{real}\left(2c_m \sum_{n=1}^{N} r_n h_{1n}^*\right)$$

and storing the same as a second value;
calculating $$\text{real}\left(2\hat{d}_2(c_m) \sum_{n=1}^{N} r_n h_{2n}^*\right)$$

and storing the same as a third value;
calculating $$|c_m|^2 \sum_{n=1}^{N} |h_{1n}|^2$$

and storing the same as a fourth value;
calculating $$|\hat{d}_2(c_m)|^2 \sum_{n=1}^{N} |h_{1n}|^2$$

and storing the same as a fifth value;
calculating $$\text{real}\left(2c_m^* \hat{d}_2(c_m) \sum_{n=1}^{N} h_{1n}^* h_{2n}\right)$$

and storing the same as a sixth value;
subtracting the second and third values from the first value; and
adding a subtraction value from the previous step and the fourth through sixth values to generate a Euclidean distance value when the candidate TX vector is $(c_m, \hat{d}_2(c_m))$.

17. The receiving method of claim 15, wherein the LLRs are calculated using one of a log-MAP (maximum a posteriori) process and a max log-MAP process.

18. The receiving method of claim 14, further comprising:
deinterleaving the calculated LLRs; and
soft-decision-decoding the deinterleaved LLRs to recover a data bit stream.

* * * * *